June 2, 1953 — G. D. BRICKER — 2,640,195
EYESHADE
Filed Aug. 13, 1951
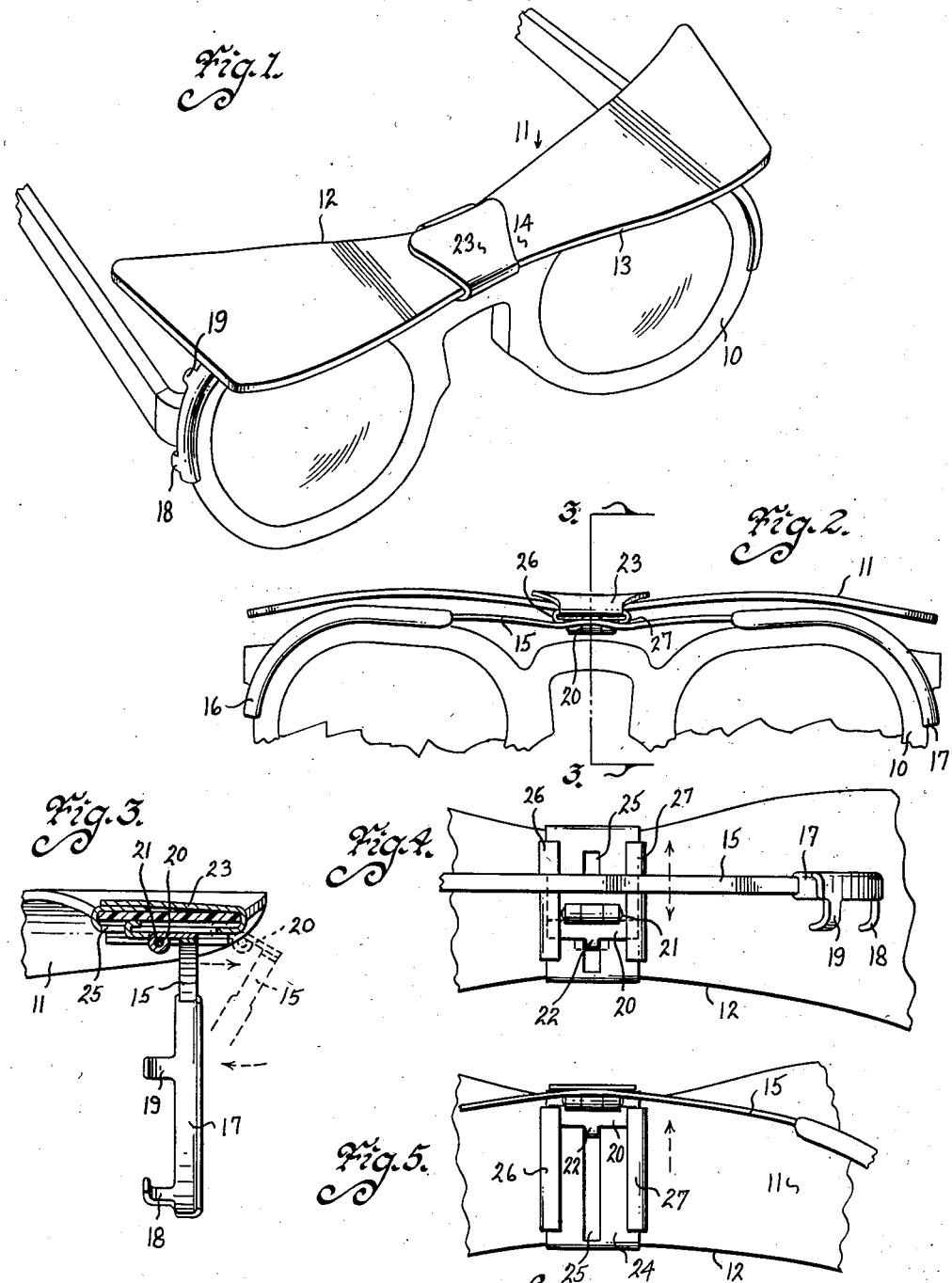
Inventor: George Dale Bricker
by M. Talbert Dick
Attorney
Witness
Edward P. Seeley Patented June 2, 1953

2,640,195

UNITED STATES PATENT OFFICE 2,640,195

EYESHADE

George Dale Bricker, Des Moines, Iowa

Application August 13, 1951, Serial No. 241,553

7 Claims. (Cl. 2—13)

My invention relates to eye shields of the type adapted to protect the eyes from overhead light.

Devices for shielding the eyes against glare of bright lights, sunlight and the like are not new. Visors secured to a head band or cap and sun glasses embody two ways of providing eye protection and in my pending patent application on a Detachable Visor for Spectacles, filed June 2, 1951, Serial Number 229,550, I show a new means for accomplishing this purpose. In this application I have invented yet another eye shield that has characteristics and objects not heretofore contemplated.

The principal object of my invention is to provide an eye shield to protect the eyes from overhead light that can be used by persons who either wear glasses or do not require them.

A further object of this invention is to provide an eye shield of the above class that is foldable into a flat unit by a novel means so that it can be easily stored when not in use.

A still further object of my invention is to provide an eye shield that extends outwardly above the eyes of the wearer and at substantially right angles thereto and which can be adjusted so as to engage the forehead or be spaced therefrom, if desired.

Still other objects of this invention are to provide an eye shield that is neat in appearance, convenient to carry, and economical in manufacture.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of my eye shield shown on a pair of glasses,

Fig. 2 is a front view of the shield in Fig. 1 and showing only the upper portion of the glasses, Fig. 3 is a cross-sectional view of my shield taken on the line 3—3 of Fig. 2, Fig. 4 is a view from the underside of the shield showing the manner of securing the spring clip thereto, and Fig. 5 is a similar view as in Fig. 4 but showing an adjustable position of the shield in relation to the spring clip.

Referring to the drawings, I have used the numeral 10 to designate a frame for glasses to illustrate my new eye shield. It should be observed, however, that this shield, if used with glasses, may be used on the rimless lenses as well as on a regular frame.

The wing-like shield or shade 11 is preferably made from any suitable transparent material that will protect the eyes from light rays and it may be made from translucent material, if desired. The shield 11, as shown in Fig. 1, has a concave rear edge 12 designed to conform generally with the curvature of the forehead of the wearer. The center portion of the front edge 13 is also concave to provide the reduced body portion 14.

An elongated spring bar clip or clamp 15 is used for supporting the shade or shield 10 and detachably securing it to the frame 10. This clip is preferably made from a single length of spring material and has its respective end portions 16 and 17 curved downwardly to conform generally to the outline of the frame 10 or to the lenses, if the glasses be of the frameless type. On each of the curved end portions 16 and 17 of the clip 15, I provide two spaced apart hooks 18 and 19 that are adapted to frictionally engage the edge of the frame or lens as illustrated in Fig. 1. The center portion of the clip 15 is secured to one end portion of a hinge member 20 so as to be parallel to the longitudinal axis of the hinge pin 21, as shown in Fig. 4. On the other edge portion a projection is formed at the center thereof, which is bent first upwardly and then back upon itself to form the hook member 22 (Fig. 3).

A bracket 23 for supporting the clip 15 is mounted on the reduced portion 14 of the shield 10 in any suitable manner so that there will be a flat surface 24 parallel with and slightly spaced from the underside of the reduced portion 14, as shown in Figs. 4 and 5. A slot 25 is provided intermediate but not to the ends in the surface 24 and extends transversely the longitudinal axis of the shield 11. The respective side edges of the surface 24 are bent downwardly and inwardly to provide the channel guide supports 26 and 27.

The hinge member 20 is supported by and slidable within the guides 26 and 27 and the hook member 22 is slidable within the slot 25. This hook will engage the surface 24 at each end of the slot 25 and by this means the movement of the shield 11 in a direction transversely the longitudinal axis of the shield is limited in two directions. It is pointed out that the spring clip 15 moves to the outer side of the guides 26 and 27. The forward end of the slot 25 is positioned so that when the hook 22 is engaged at that point, sufficient of the hinge 20 will be outside the confines of the guide brackets 26 and 27 whereby the clip 15 can be folded against the underside of the shield 11. The dotted lines in Fig. 3 illustrated this hinge action which make it possible to make a flat unit of the shield and clip for carrying in a pocket, bag or the like.

From the disclosure hereinabove made it is not intended that my new shield be limited to use with a pair of glasses since that is but one form illustrated to point out this invention. A person who does not wear glasses can use this shield by attaching it to a frame for glasses without the lenses. Preferably, for this purpose, the frame need consist only of the bows, a nose piece and the upper portion of the lens retaining portion of the frame. Such a shield would appear similar to the shield and fragmentary frame shown in Fig. 2. It is also to be observed that a rigid member such as a bar, rod or the like can be substituted for the spring clip 15 and secured to the frame. The spring clip 15 is shown since its resiliency makes it possible to snap the shield on and off a pair of glasses but my shield is not limited to the snap-on feature.

As disclosed above, the hinge will slide within the brackets 26 and 27 transversely the length of the shield, or in other words, when the shield is in place it will be capable of a forwardly and rearwardly movement. By this arrangement, the edge 12 of the shield can be moved snugly against the forehead or move forwardly to suit the comfort of the wearer.

This shield whether of a detachable or non-detachable type and whether used with glasses or with a fragmentary frame for glasses, as described, will be capable of the forward and rear adjustment and of the folding action which I have described.

Some changes may be made in the construction and arrangement of my eye shield without departing from the real spirit and purpose of my invention, and it is my intention to cover by my claims, any modified forms of structure or use of mechanical equivalents which may be reasonably included within their scope.

I claim:

1. In an eye shade adapted to be used on a frame means having at least a nose engaging portion and ear bows, a wing-like eye shade, a supporting member for said wing-like eye shade adapted to be operatively secured to a frame means, a hinge means on said supporting member, a hook member on one side of said hinge means, a bracket member on said eye shade, a slot in said bracket member extending in a direction transversely the longitudinal axis of said eye shade, said hinge means mounted in said bracket member so said hook member is slidable within said slot, and said supporting member in operable position being perpendicular to said eye shade and foldable by said hinge means so as to be parallel with said eye shade at times.

2. In an eye shade adapted to be used on a frame means having at least a nose engaging portion and ear bows, a wing-like eye shade, a supporting member for said wing-like eye shade adapted to be operatively secured to a frame means, a hinge means on said supporting member, a hook member on one side of said hinge means, a bracket member on said eye shade, a slot in said bracket member extending in a direction transversely the longitudinal axis of said eye shade, said hinge means mounted in said bracket member so said hook member is slidable within said slot, said hook member capable of engaging said bracket member at each end of said slot to serve as a means for limiting the movement of said hinge means in two directions, and said supporting member in operable position being perpendicular to said eye shade and foldable by said hinge means so as to be parallel with said eye shade at times.

3. In an eye shade adapted to be used on a frame means having at least a nose engaging portion and ear bows, a wing-like eye shade, a supporting member for said wing-like eye shade adapted to be operatively secured to a frame means, a hinge means on said supporting member, said hinge means secured to said eye shade so as to be slidable thereon in a direction transversely its length, said supporting member normally being perpendicular to said eye shade, and said supporting member foldable by said hinge means so as to be parallel with said eye shade for purposes of storage, and means for locking said hinge means against hingable movement at times.

4. In an eye shade adapted to be used on a frame means having at least a nose engaging portion and ear bows, a wing-like eye shade, a supporting member for said wing-like eye shade adapted to be operatively secured to a frame means, a hinge means on said supporting member, a hook member on one side of said hinge means, a bracket member on said eye shade, a slot in said bracket member extending in a direction transversely the longitudinal axis of said eye shade, said hinge means mounted in said bracket member so said hook member is slidable within said slot, said hook member capable of engaging said bracket member at each end of said slot to serve as a means for limiting the movement of said hinge means in two directions, and said supporting member in operable position being perpendicular to said eye shade and foldable by said hinge means so as to be parallel with said eye shade at times, and means on said bracket member for locking said hinge means against hingable movement at times.

5. In an eye shade, a wing-like shade member, a supporting member for said wing-like eye shade member, a hinge means on said supporting member, a hook on said hinge means, a bracket on said eye shade member, a slot in said bracket extending in a direction transversely the longitudinal axis of said eye shade member, said hinge means mounted in said bracket so said hook is slidable within said slot, stop means for limiting the movement of said hinge means in two directions and means on said bracket for locking said hinge means against hingable movement at times.

6. In an eye shade, a wing-like eye shade member, a supporting member for said wing-like eye shade member, a hinge means on said supporting member, a bracket on said eye shade member, said hinge means slidably mounted in said bracket, stop means for limiting the movement of said hinge means in two directions and means for locking said hinge means against hingable movement at times.

7. In an eye shade, a wing-like eye shade member, a supporting member for said wing-like eye shade member, a bracket member on said eye shade member having a groove, and a hinge member having two wing portions, one of which is rigidly secured to said supporting member and slidably mounted in the groove of said bracket member; said hinge member when having both of its wing portions engaging said groove being incapable of functioning as a hinge and capable of functioning as a hinge when only one of its wings is engaged in said groove.

GEORGE DALE BRICKER.

References Cited in the file of this patent

UNITED STATES PATENTS

| Number | Name | Date |
|---|---|---|
| 886,209 | Henry | Apr. 28, 1908 |
| 932,703 | Henry | Aug. 31, 1909 |
| 2,224,560 | Wentz | Dec. 10, 1940 |
| 2,433,590 | Barr | Dec. 30, 1947 |